(12) United States Patent
Jechoux

(10) Patent No.: US 6,907,061 B1
(45) Date of Patent: Jun. 14, 2005

(54) METHOD FOR CONTROLLING THE EMISSION POWER OF A TRANSCEIVER IN COMMUNICATION WITH ANOTHER TRANSCEIVER

(75) Inventor: Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,893

(22) Filed: May 26, 2000

(30) Foreign Application Priority Data

May 27, 1999 (EP) .......................................... 99401272

(51) Int. Cl.$^7$ .............................................. H04L 27/30
(52) U.S. Cl. ...................... 375/144; 375/146; 375/219; 375/295; 370/252; 370/318; 455/52.1; 455/65; 455/226.2; 455/231
(58) Field of Search ................................ 375/130, 144, 375/146–148, 219, 220, 295; 370/252, 278, 282, 311, 318; 455/52.1, 52.3, 65, 69, 67, 226.1, 226.2, 230, 231, 296, 521, 523, 67.1

(56) References Cited

U.S. PATENT DOCUMENTS

| 6,178,193 B1 | * | 1/2001 | Kondo ......................... 375/130 |
| 6,434,130 B1 | * | 8/2002 | Soininen et al. ............. 370/331 |
| 6,449,463 B1 | * | 9/2002 | Schiff ........................... 455/69 |

FOREIGN PATENT DOCUMENTS

EP 0884861 A2 12/1998

OTHER PUBLICATIONS

"Simulation of Average Fading Duration Using Deterministic Method", Wang Xiao, et al, Electronics Letters Apr. 1, 1999, vol. 35, No. 7, pp. 542–544.

"A Power–Spectral Theory of Propagation in the Moblie–Radio Environment", M. Gans, IEEE Transactions on Vehicular Technology, vol. VT–21, No. 1, Feb. 1972 p. 27–38.

* cited by examiner

Primary Examiner—Dac V. Ha
(74) Attorney, Agent, or Firm—Birch, Stewart, Kolasch & Birch, LLP

(57) ABSTRACT

The present invention relates to a method for use in controlling the emission power of a transceiver which is in communication with another transceiver via a communication system, said method including the steps of measuring the amplitude or the power of the signal received by said transceiver and of evaluating a power control command which is then used to command the emission power of said transceiver according to said control command signal. According to the invention, the method includes the steps of evaluating the fast fading duration of the received signal on basis of said amplitude or power measurement and of deducing the power control command from said fast fading duration.

11 Claims, 2 Drawing Sheets

METHOD FOR CONTROLLING THE EMISSION POWER OF A TRANSCEIVER IN COMMUNICATION WITH ANOTHER TRANSCEIVER

This nonprovisional application claims priority under 35 U.S.C. § 119(a) on Patent Application No. 99401272.2 filed in the United Kingdom on May 27, 1999, which is herein incorporated by reference.

BACKGROUND OF THE INVENTION

1. Field of the Invention

The present invention relates to a method for use in controlling the emission power of a transceiver which is in communication with another transceiver, for use for example in a wireless communication system.

2. Description of the Background Art

Reference will now be made to FIG. 1 of the accompanying drawings which shows a transceiver 10 in communication with another transceiver 20 via a wireless communication system. Transceiver 10 is for example located in a base station and transceiver 20 in a mobile station. Data are exchanged between the transceiver 10 and the transceiver 20 via a wireless interface, a so-called radio channel. In FIG. 1, the transceiver 20 receives from the transceiver 10 a radio signal references as RC and sends to the transceiver 10 a radio signal with a power referenced as P. The same is for transceiver 10.

The characteristics of radio channels (for example: phase and amplitude) change continuously, due to variations in the geographical environment between a mobile station and a base station. These variations can be separated into free space propagation losses, slow fading and fast fading losses. Free space propagation losses depend on the path length between the transmitter and the receiver and can be modelled by a $d^{-n}$ law where n is a number between 2 and 4 and d is the path length. Slow fading losses are due to shadowing occurring when obstacles, such as buildings, trees, etc., are interposed between the transmitter and the receiver. Slow fading losses are known to generate variations in channel power for movements that are in the order of 10 times the wavelength of the radio signal. They can be modelled by a log normal law the standard deviation σ of which ranges between 4 and 12 dB depending on the kind of environment. Finally, fast fading losses are due to multipath effect in which a signal follows different paths and the resulting received signals recombine at the receiver entrance with different delays, amplitudes and phases. They can be modelled by a Rayleigh distribution. Movements that are in the order of 1/100 of the wavelength of the radio signal are sufficient to generate fast fading.

Most telecommunication systems use power control methods to limit interference and power consumption. Power control methods aim to command an emission power of both transceivers as close as possible to the minimum needed for a defined quality of transmission.

Such a method includes, carrying out in an evaluating unit 200 of a transceiver (here the transceiver 20), the steps of measuring the received power of the radio signal RC (or its amplitude) and, on basis of the result of this measurement, of evaluating a power control command PC. The power control command PC is used to command a transmission unit 210 so that it transmits signals with a power P corresponding to the command PC.

Note that the transceiver 10 comprises also such an evaluating unit and a transmission unit.

Due to the time duration (referenced as td in the following description) between the moment of the input amplitude measurement (made in the evaluating unit 200) and the moment of the use of the control command signal PC to command the emission power P (made in the transmission unit 210), the power control methods are based on a measurement and an evaluation which are made during reception and which are used to determine the power to be transmitted during the next emission.

The value of the time duration $t_d$ is imposed by the system for given periods and thus is known by the considered transceiver.

The emission power P is applied with a certain delay $t_d$ after the measurement has been made by the evaluating unit 200; hence the channel features can have significantly changed between the evaluation and the application of the PC command. The power control command PC then wrongly compensates the channel variations, particularly in the case of fast fading losses, where the stronger the fading is, the quicker it disappears.

SUMMARY OF THE INVENTION

It is therefore an object of the present invention to overcome the above-mentioned problem and then to propose a method for adaptive power control, which can be used in communication systems wherein the power control delay is longer than the time needed for significant variations in channel features to occur.

To this end, a method for controlling the emission power of a transceiver in communication with another transceiver of a communication system according to the present invention includes the steps of evaluating the fast fading duration and of deducing the power control command from the fast fading duration on basis of the amplitude or the power measurement made by the receiver.

According to another feature of the invention, the method includes, for deducing the power control command, the step of comparing the evaluated fast fading duration with the time duration between the amplitude or the power measurement and the emission power setting, and according to the result of the comparison, in determining said the power control command.

According to another feature of the invention, the method includes the step of setting the control command signal PC at the inverse of the measured amplitude $1/L_m$ if the fast fading duration $t_f$ is higher than the time duration $t_d$ between the amplitude or power measurement and the emission power setting and at the inverse of the short-term average of the measured amplitude $1/L_{av}$ if it is equal to or lower than said time duration $$1/L_m \text{ if } t_f > t_d \qquad\qquad\qquad\qquad\qquad\qquad i$$
$$1/L_{av} \text{ if } t_f \le t_d.$$

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
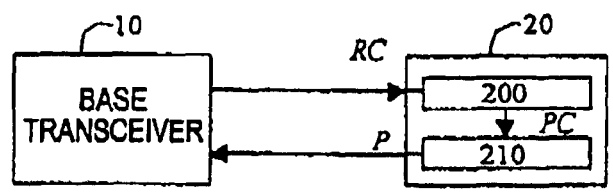
FIG. 1 is a schematic diagram illustrating a communication system provided with a power control system.

The method of the invention is applied to a communication system such as the system represented in FIG. 1 and is carried out in the evaluating unit of each transceiver 10, 20 of the communication system. Only, the evaluating unit 200 of the transceiver 20 is now considered.

Figure 2:
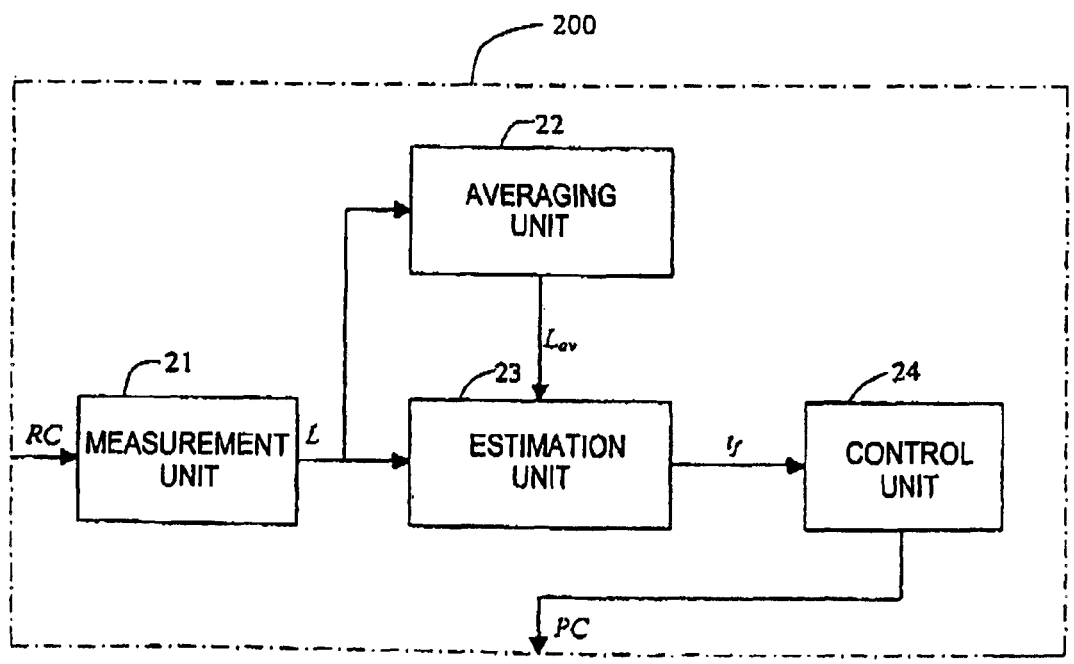
FIG. 2 is a block schematic diagram of an evaluating unit of a transceiver in a communication system provided for carrying a method according to the inventions.

The evaluating unit 200 depicted in more detail in FIG. 2 has a measurement unit 21 for measuring at predetermined times t the amplitude $L_m$ of the received signal RC, a averaging unit 22 for determining the short-term average $L_{av}$ of the measured amplitude $L_m$, an estimation unit 23 for estimating the fading duration $t_f$ and a control unit 24 for determining the power control command signal PC which is provided for use by a transmission unit 210 to set the emission power P at the value given by the PC command.

Figure 3:
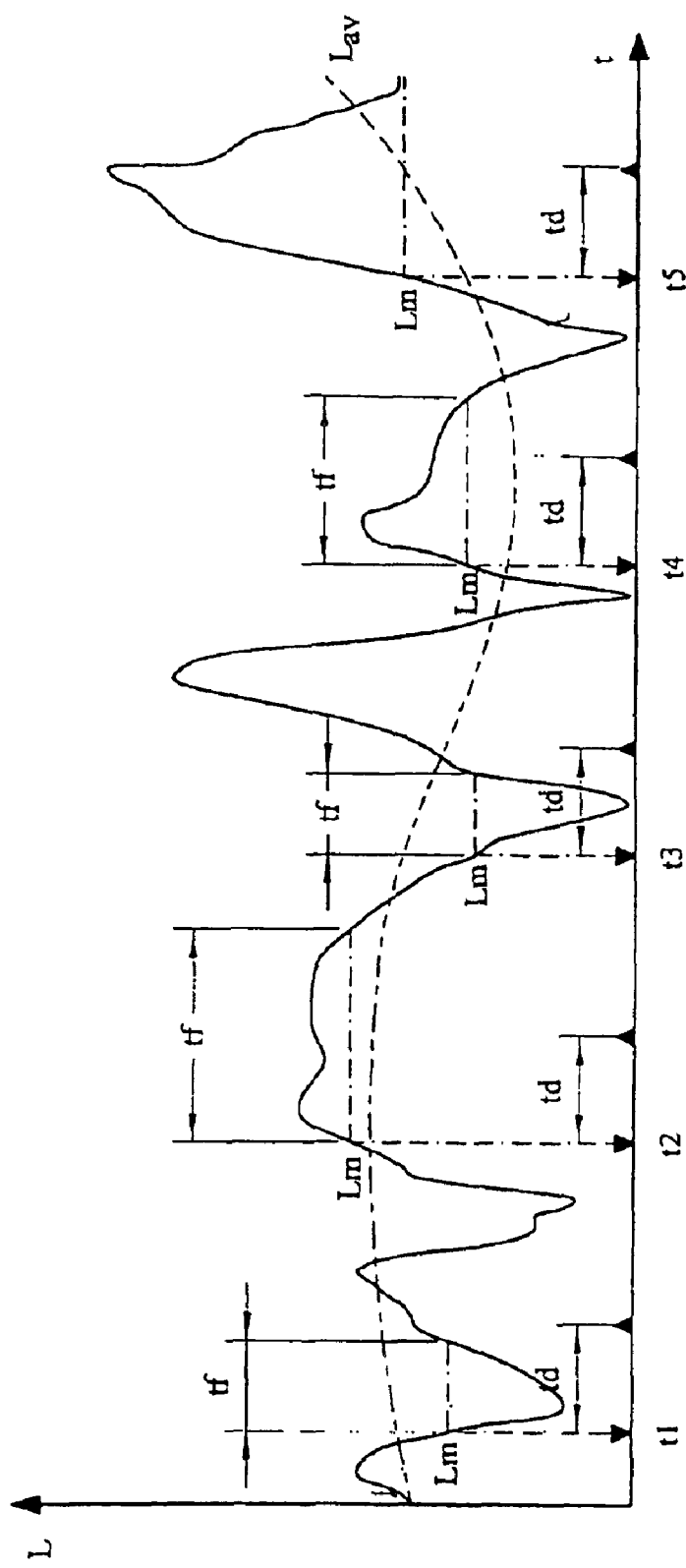
FIG. 3 is a graphic illustrating the received amplitude with time for use in explaining the method according the invention.

FIG. 3 shows the variations with time of the received amplitude L at the receiver 20 input. Downward arrows indicate measurement times made by the evaluating unit 200 and upward arrows indicate the emission times made by the transmission unit 210. At measurement times, the received amplitude is the measured amplitude and is noted $L_m$. The dotted line represents the short-term average of the measured amplitude $L_m$ that is then noted as $L_{av}$. The received amplitude L is representative of the free space fading, of the shadowing fading and of the fast fading. The short time average amplitude $L_{av}$ is representative of only the free space fading and the shadowing fading.

Note that the short-term amplitude $L_{av}$ is defined as being the average of the measured amplitude $L_m$ over time periods corresponding to the variation time of the slow fading essentially due to shadowing.

The fading duration $t_f$ is defined as being the average time for which the received amplitude L will stay below the measured amplitude $L_m$ if said measured amplitude $L_m$ is lower than the short-term average amplitude $L_{av}$ or above the measured amplitude $L_m$ if said measured amplitude $L_m$ is higher than the short-term average amplitude $L_{av}$.

In order to optimise the confidence level of the power control, the method according to the invention determines the power control command signal regarding the estimated fading duration $t_f$ derived from the fading depth $L/L_{av}$. In other words, the power control command value $PC(t_d)$ is equal to the inverse of measured amplitude if the fading duration $t_f$ is longer than the delay id between the moment of the amplitude measure made by the evaluating unit 200 and the application of the power control command $PC(t_d)$ to the transmission unit 210 and is equal to the inverse of the average amplitude $L_{av}$ if it is shorter:

$$1/L_m \text{ if } t_f > t_d$$

-continued
$$1/L_{av} \text{ if } t_f \leq t_d.$$

Note that the power control command value $PC(t_d)$ is the value which will be used by the transceiver 20 at the present time+$t_d$ to set the emission power P at the evaluated value $PC(t_d)$.

In FIG. 3, at time t1, the fading time $t_f$ is shorter than the time duration $t_d$. Hence, the power control command $PC(t_d)$ is the inverse of the short term average amplitude $1/L_{av}$. It is the same for the time t3. At time t2, the fading time to is higher than the time duration td. Hence the power control command $PC(t_d)$ is the inverse of the measured amplitude $1/L_m$. It is the same for time t4.

Note that the fading duration is too short to impact upon the emission for cases t1 and t3 but it is long enough to do so for cases t2 and t4.

The method of the invention give an adaptive amplitude correction able to balance fast fading as well as shadowing and free space losses, since the short-term amplitude average $L_{av}$ correct shadowing and free space channel variations.

Note that the estimation unit 23 needs the value of the speed v of the transceiver 20 relative to the transceiver 10 to evaluate the fading duration $t_f$. A dedicated unit (not shown) can determine or evaluate and deliver this value.

From a publication of Gans in IEEE Trans. Veh. Technol., Vol. VT21, February 1972, pp.27–38, the fast fading duration can be estimated in the following way:

$$t_f = \begin{cases} (a) & \text{if } \overline{L} < 1 \\ \frac{\lambda}{\sqrt{2\pi Lv}}\left[e^{(\overline{L})} - 1\right] \\ (b) & \text{if } \overline{L} < 1 \end{cases}$$

where $\overline{L}$ is the measured amplitude $L_m$ at a measurement time normalised by the short-term average amplitude $L_{av}$ ($\overline{L}=L_m/L_{av}$), v and $\lambda$ are respectively the speed of one transceiver 10 relative to the other 20 and the wavelength of the carrier used by the communication system.

The power control command $PC(t_d)$ can be now given by the following scheme:

$$a. \ PC(t_d) = \begin{cases} 1/L_m \begin{cases} \text{if } \overline{L} < 1 \text{ and } t_d < \frac{\lambda}{\sqrt{2\pi}\ Lv}\left[e^{(\overline{L}^2)} - 1\right] \\ \text{if } \overline{L} \geq 1 \text{ and } t_d < \frac{\lambda}{\sqrt{2\pi}\ Lv} \end{cases} \\ 1/L_{av} \begin{cases} \text{if } \overline{L} < 1 \text{ and } t_d \geq \frac{\lambda}{\sqrt{2\pi}\ Lv}\left[e^{(\overline{L}^2)} - 1\right] \\ \text{if } \overline{L} \geq 1 \text{ and } t_d \geq \frac{\lambda}{\sqrt{2\pi}\ Lv} \end{cases} \end{cases}$$

where $PC(t_d)$ is the power control command which will be used at the present time (assumed to be zero)+$t_d$, L is the received amplitude, $L_{av}$ is the short-term average of the measured amplitude, $t_d$ is the time delay between the moment of the measurement of the received amplitude $L_m$ and the use of the PC command and $$\bar{L} = \frac{L_m}{L_{av}}$$

is the normalised received amplitude.

A simplified equation can easily be derived:

$$PC(t_d) = \begin{cases} 1/L_m & \text{if } t_d < \frac{\lambda * \min\left(\bar{L}, \frac{1}{\bar{L}}\right)}{\sqrt{2\pi}\, v} \\ 1/L_{av} & \text{if } t_d \geq \frac{\lambda * \min\left(\bar{L}, \frac{1}{\bar{L}}\right)}{\sqrt{2\pi}\, v} \end{cases}$$

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling an emission power of a transceiver that is in communication with another transceiver via a communication system, said method comprising:

measuring an amplitude or power of a signal received by said transceiver;

evaluating a fast fading duration of the received signal based on the amplitude or power measurement;

setting a power control command signal at the inverse of the measured amplitude if the fast fading duration is higher than a time duration between the amplitude or power measurement and an emission power setting and setting the power control command signal at the inverse of an average of the measured amplitude if the fast fading duration is equal to or lower than the time duration; and controlling the emission power of said transceiver according to said power control command.

2. The method according to claim 1, further comprising the steps of:

comparing the evaluated fast fading duration with the time duration between the amplitude or the power measurement and the emission power setting; and determining said power control command according to the result of the comparison.

3. The method according to claim 1, wherein said fast fading duration is evaluated by the following equation:

$$t_f = \begin{cases} (a) & \text{if } \bar{L} < 1 \\ \frac{\lambda}{\sqrt{2\pi L v}}\left[e^{(\bar{L})} - 1\right] \\ (b) & \frac{\lambda}{\sqrt{2\pi L v}} & \text{if } \bar{L} < 1 \end{cases}$$

where $\bar{L}$ is the measured amplitude $L_m$ at a measurement time normalized by a short-term average amplitude $L_{av}$ ($\bar{L}=L_m/L_{av}$), $v$ and $\lambda$ are respectively the speed of said transceiver relative to the other transceiver and the wavelength of a carrier used by the communication system.

4. The method according to claim 1, wherein said power control command signal is determined by the following equation:

$$PC(t_d) = \begin{cases} 1/L_m \begin{cases} \text{if } \bar{L} < 1 \text{ and } t_d < \frac{\lambda}{\sqrt{2\pi}\, \bar{L} v}\left[e^{(\bar{L}^2)} - 1\right] \\ \text{if } \bar{L} \geq 1 \text{ and } t_d < \frac{\lambda}{\sqrt{2\pi}\, \bar{L} v} \end{cases} \\ 1/L_{av} \begin{cases} \text{if } \bar{L} < 1 \text{ and } t_d \geq \frac{\lambda}{\sqrt{2\pi}\, \bar{L} v}\left[e^{(\bar{L}^2)} - 1\right] \\ \text{if } \bar{L} \geq 1 \text{ and } t_d \geq \frac{\lambda}{\sqrt{2\pi}\, \bar{L} v} \end{cases} \end{cases}$$

where $PC(t_d)$ is the power control command signal which will be used at the present time (assumed to zero)+$t_d$, $L_m$ is the measured amplitude, $L_{av}$ is a short-term average of the measured amplitude, $t_d$ is a time delay between the moment of the measurement of the measured amplitude $L_m$ and the use of the PC command and $$\bar{L} = \frac{L_m}{L_{av}}$$

is a normalized measured amplitude.

5. The method according to claim 1, wherein said power control command signal is determined by the following equation:

$$PC(t_d) = \begin{cases} 1/L_m & \text{if } t_d < \frac{\lambda * \min\left(\bar{L}, \frac{1}{\bar{L}}\right)}{\sqrt{2\pi}\, v} \\ 1/L_{av} & \text{if } t_d \geq \frac{\lambda * \min\left(\bar{L}, \frac{1}{\bar{L}}\right)}{\sqrt{2\pi}\, v} \end{cases}$$

where $PC(t_d)$ is the power control command signal which will be used at the present time (assumed to zero)+$t_d$, $L_m$ is the measured amplitude, $L_{av}$ is a short-term average of the measured amplitude, $t_d$ is a time delay between the moment of the measurement of the measured amplitude $L_m$ and the use of the PC command and $$\bar{L} = \frac{L_m}{L_{av}}$$

is a normalized measured amplitude.

6. An apparatus comprising:

an evaluating unit for evaluating a power command based on a signal received by a transceiver; and a transmission unit for transmitting signals with a power corresponding to the power command, wherein the evaluating unit includes an estimation unit for estimating a fast fading duration of the signal received by the transceiver and a control unit for determining a power control command signal based on the fast fading duration estimation made by the estimation unit, wherein the control unit sets the power control command signal at the inverse of a measured amplitude if the fast fading duration is higher than a time duration between the amplitude or power measurement and an emission power setting and sets the power control command at the inverse of an average of the measured amplitude if the fast fading duration is equal to or lower than the time duration.

7. The apparatus according to claim 6, wherein the control unit compares the estimated fast fading duration with a time duration between the amplitude or the power measurement and the emission power setting, and determines said power control command signal according to a result of the comparison.

8. The apparatus according to claim 7, further comprising:
a measurement unit for measuring the amplitude or the power of the received signal and an averaging unit and for determining a short-term average of the measured amplitude or power.

9. The apparatus according to claim 6, wherein the estimation unit estimates the fast fading duration by the following equation:

$$t_f = \begin{cases} (a) & \dfrac{\lambda}{\sqrt{2\pi}\, \overline{L} v}\left[e^{(\overline{L}^2)} - 1\right] \text{ if } \overline{L} < 1 \\ (b) & \dfrac{\lambda}{\sqrt{2\pi}\, \overline{L} v}\left[e^{(\overline{L}^2)} - 1\right] \text{ if } \overline{L} \geq 1 \end{cases}$$

where $\overline{L}$ is the measured amplitude $L_m$ at a measurement time normalized by a short-term average amplitude $L_{av}$ ($\overline{L} = L_m/L_{av}$), $v$ and $\lambda$ are respectively the speed of the transceiver relative to another transceiver and the wavelength of a carrier used by the apparatus.

10. The apparatus according to claim 6, wherein said power control command signal delivered by the control unit is determined by the following equation:

$$PC(t_d) = \begin{cases} 1/L_m \begin{cases} \text{if } \overline{L} < 1 \text{ and } t_d < \dfrac{\lambda}{\sqrt{2\pi}\, \overline{L} v}\left[e^{(\overline{L}^2)} - 1\right] \\ \text{if } \overline{L} \geq 1 \text{ and } t_d < \dfrac{\lambda}{\sqrt{2\pi}\, \overline{L} v} \end{cases} \\ 1/L_{av} \begin{cases} \text{if } \overline{L} < 1 \text{ and } t_d \geq \dfrac{\lambda}{\sqrt{2\pi}\, \overline{L} v}\left[e^{(\overline{L}^2)} - 1\right] \\ \text{if } \overline{L} \geq 1 \text{ and } t_d \geq \dfrac{\lambda}{\sqrt{2\pi}\, \overline{L} v} \end{cases} \end{cases}$$

where $PC(t_d)$ is the power control command signal which will be used at the present time (assumed to zero)+$t_d$, $L_m$ is the measured amplitude, $L_{av}$ is a short-term average of the measured amplitude, $t_d$ is a time delay between the moment of the measurement of the measured amplitude $L_m$ and the use of the PC command and $$\overline{L} = \dfrac{L_m}{L_{av}}$$

is a normalized measured amplitude.

11. The apparatus according to claim 6, wherein said power control command signal delivered by the control unit is determined by the following equation:

$$PC(t_d) = \begin{cases} 1/L_m & \text{if } t_d < \dfrac{\lambda * \min\left(\overline{L}, \dfrac{1}{\overline{L}}\right)}{\sqrt{2\pi}\, v} \\ 1/L_{av} & \text{if } t_d \geq \dfrac{\lambda * \min\left(\overline{L}, \dfrac{1}{\overline{L}}\right)}{\sqrt{2\pi}\, v} \end{cases}$$

where $PC(t_d)$ is the power control command signal which will be used at the present time (assumed to zero)+$t_d$, $L_m$ is the measured amplitude, $L_{av}$ is a short-term average of the measured amplitude, $t_d$ is a time delay between the moment of the measurement of the measured amplitude $L_m$ and the use of the PC command and $$\overline{L} = \dfrac{L_m}{L_{av}}$$

is the normalized measured amplitude.

* * * * *